Fig. 2

United States Patent Office 3,107,849
Patented Oct. 22, 1963

3,107,849
SALES REGISTERING AND RECORDING DEVICE
Verle S. Johnston, Park Ridge, and Richard E. Maples and Eugene Heal, Chicago, Ill., assignors to Victor Adding Machine Co., Chicago, Ill., a corporation of Illinois
Filed Nov. 25, 1957, Ser. No. 698,447
9 Claims. (Cl. 235—60.38)

The present invention relates to means for registering and totalizing business sales in the manner of a cash register or adding machine and making a coded record of sales that can be processed to produce sales data.

In directing the operations of department stores, supermarkets, and other businesses which make a large number of sales, it is extremely helpful to have a running tabulation of current sales made by different departments of the business and of sales of different classes of foods and services. For example, in a supermarket, the manager may want to keep separate accounts of meat sales, produce sales, grocery sales and the like. The management of salespeople can be aided by accounts of the sales made by different individuals. Moreover, it is necessary to make some provision for checking receipts against the sales made.

In such business establishments it is common practice to enter each individual sale or sales item into a cash register or adding machine which prints a record of the amount of the sale along with an identification of the individual making the sale and a designation of the type or category of the sale. The processing of such printed records to obtain the desired tabulated analyses of the sales can be a laborious and time-consuming task.

One object of the invention is to provide an improved and extremely versatile sales registering and recording device which registers and totalizes sales items in the same manner as a conventional cash register or adding machine and automatically makes a coded record of its own operations that can be later processed automatically to obtain reliable sales audits and tabulations of the sales in various classes or categories according to the identification of the respective sales items at the time of original entry into the sales registering and recording device.

Another object is to provide an improved sales registering and recording device as recited in the previous object which operates automatically to record its own operations in code without interfering with or slowing the operation of mechanisms in the device which perform the normal functions of a conventional cash register or calculating machine.

A further object is to provide an improved sales registering and recording device which performs the normal functions of a cash register or adding machine and at the same time records its own operations in code in a manner such that the device is well adapted to produce its coded record in any one of a virtually unlimited number of codes or coding systems.

Another object is to provide an improved sales registering and recording device of the character recited which can be readily adapted to produce a record in code of all or any desired selection of its own operations as well as collateral matter, such as the ending of a business day or period.

Another object is to provide an improved sales registering and recording device of the above character in which a single integrated control unit will respond to the simultaneous movement into differential positions of the actuating racks of a cash register or adding machine assembly in the device to produce a sequence of electrical signals corresponding in electrical code to the differential or numerical positions of the respective actuator racks, all without interfering with or slowing the normal operation of the cash register or adding machine assembly.

An additional object is to provide in a sales registering and recording device a single integrated control unit which is capable of sensing the simultaneous momentary presence in differential or numerical positions of a plurality of actuating racks and producing a sequence of coded electrical output signals corresponding to the respective racks taken in any predetermined order desired, the output signal for each rack having a numerical value in code corresponding to the differential or numerical position of the rack at the instant the momentary positions of all the racks were sensed at once by the control unit.

An additional object is to provide in a cash register or mechanical calculating machine a highly versatile recording control unit of the above character which is well adapted for economical manufacture and which has an inherent capacity to operate with undiminished efficiency over a long service life of hard usage.

Other objects and advantages will become apparent from the following description of the exemplary form of the invention shown in the drawings, in which.

Figure 1:
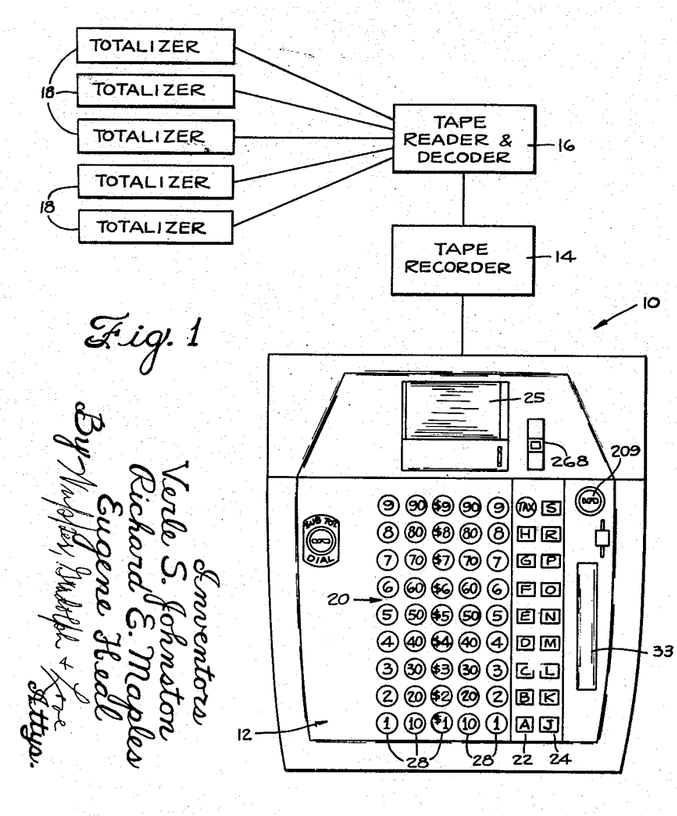
FIG. 1 is a diagrammatic illustration of a sales registering and tabulating system incorporating the invention.

As illustrated in the drawings, the present invention is embodied in an input or registering unit 10 used in the system illustrated in FIG. 1. Operated by a keyboard 12, the input unit 10 is formed by an integrated combination of mechanisms capable of performing the normal functions of a conventional cash register or adding machine with highly versatile code signal means that automatically provides electrical output signals in code for controlling a connected recorder 14 to make a record in code of preselected operations of the input unit and of collateral information that is useful later in automatically reading the coded record in an automatic reader and decoder 16. In the present instance, the recorder 14 produces the desired record in a tape punched in code.

In the reader and decoder 16 the individual operations of the input unit 10 recorded in the coded record are identified by identifying data also recorded in code on the same record medium, e.g., punched tape. As will presently appear, the identification of each recorded operation of the input unit 10 can be quite specific. Operations which register the numerical amount of individual sales items can be identified as to the character of the sale and the person making the sale.

Identified and differentiated from each other in the reader and decoder 16, the decoded values of the recorded operations of the input unit 10 are directed into a plurality of tabulators or totalizers 18 according to the identification or classification of the individual input unit operations. Thus each totalizer 18 will be operated to accumulate and totalize the numerical values of input unit operations of a specific character or class.

The keyboard 12 is that of a conventional cash register slightly modified to include protective locks and additional controls used in recording collateral information which facilitates the automatic processing of the coded record.

As shown in FIG. 1, the keyboard 12 is of the "full keyboard" type and includes a full set of keys 20 arranged in seven denominational orders of nine keys each. In accordance with conventional practice, the two denominational orders 22 and 24 on the extreme right hand side of the group of seven denominational orders of keys are used respectively to identify the character of the successive sales items entered into the keyboard and the identity of the individual to whom the sales are to be credited. While two denominational orders of keys are used in this instance for the identification of sales, it will be understood that the number of keys and the number of denominational orders used for this purpose can be varied. The remaining five denominational orders of keys are used in registering the numerical amount of each sales item.

The keys 20 operate in a conventional manner to control mechanism in the input unit 10 which register each individual sales item along with the sales identifying data. In the particular input unit 10 shown, the mechanisms which register the values entered on the keyboard 12 also print a record of each sales item on a paper tape 25 along with subtotals and totals of sales in each sales transaction with a customer.

Figure 2:
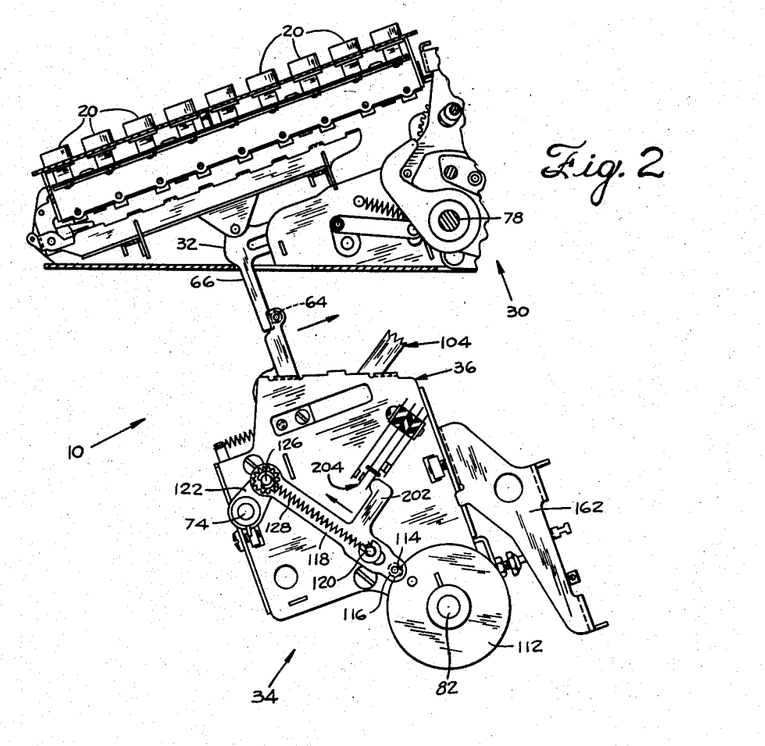
FIG. 2 is a partially sectioned right hand side view showing the physical integration of an adding machine assembly and a recorder control unit in a sales registering and recording device embodying the invention.

As illustrated in FIG. 2, the immediate sales registering functions of the keys 20 and the taking of subtotals and totals are accomplished by the conventional structure of a printer type adding machine 30 modified in a conventional manner for use in a cash register. For a detailed disclosure of an adding machine assembly of this character, reference can be made to United States Patent No. 2,486,959, issued to Thomas O. Mehan on November 1, 1949.

Since the modifications of the adding machine assembly 30 of the input unit 10, to serve the special purposes of a cash register or sales registering device, conform to standard practice in the cash register art, they need not be specifically described here. The most significant modification of the adding machine assembly 30 is that which adapts the two previously mentioned denominational orders 22, 24 of the keys to effect the printing of sales identifying data rather than numerical digits. Thus, only the remaining five denominational orders 28 in the modified adding machine assembly 30 are used in the registering and totalizing of numerical values.

It may be noted here for later reference that conventional interconnecting structure between the five denominational orders 28 of numerical keys operates to effect the entry of a zero in any denominational order in which a key is not depressed and which is located on the right hand side of any other denominational order in which a key is depressed.

For each denominational order of the keys 20, the conventional component structure of the adding machine assembly 30 includes an elongated actuator or rack 32, FIG. 2, extending from the front toward the rear of the assembly. Upon entry of a sales item by depressing appropriate ones of the keys 20 and depression of a motor bar 33 on the keyboard 12 to cycle the adding machine assembly 30, which is energized in a conventional manner by an electric motor (not shown), the actuator racks 32 are released to move rearwardly to a degree determined by the setting of the keys in the denominational orders corresponding to the respective racks. Thus, each actuator 32 can move rearwardly from a forward, starting position to any one of ten numerical positions, nine of which correspond to the respective keys in the denominational order for the actuator, and the tenth of which corresponds to a conventional zero stop (not shown) which is set in the manner previously mentioned. All this is accomplished by conventional mechanism well known in the art and disclosed in patents such as the previously mentioned Patent No. 2,486,959 and United States Patent No. 2,568,350, issued September 18, 1951, to Thomas O. Mehan.

After activating the actuators 32 to move to differential numerical positions, the cycle of the adding machine assembly 30 continues to restore all of the actuator racks 32 to their initial starting positions.

As previously mentioned, preselected operations of the adding machine assembly 30 are recorded in code on tape by the tape recorder 14. This recorder 14 is controlled by electrical signals in code. Such controlling signals are supplied in code to the recorder 14 by a control unit 34 physically combined with the adding machine assembly 30, FIG. 2, of the input unit 10.

As will presently appear, the control unit 34 is coordinated with the adding machine assembly 30 to operate automatically as an incident to operation of the adding machine assembly to produce a succession of coded recorder control signals corresponding to the differential positioning of the respective actuator racks 32 of the adding machine assembly during a given operating cycle of this assembly. Highly versatile, the control unit 34 is capable of producing its output signals in any one of the conventional codes used in operating code recording machines and machines which transmit digital values in code. The control unit 34, moreover, is equally well suited to produce its output signals in any one of the virtually unlimited number of special codes of this character. In this instance the standard teletype code is used.

Figure 6:
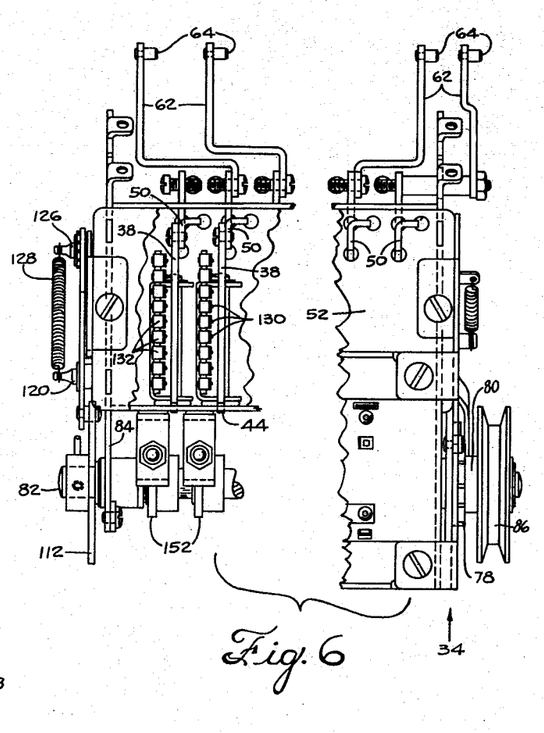
FIG. 6 is a compressed, partially sectioned rear view of the recorder control unit.

As shown in FIG. 2, the recorder control unit 34 is located beneath the adding machine assembly 30. It comprises a bank of parallel code plates 38 which are displaced individually from starting positions to differential or numerical positions as an incident to movement of the respective actuators 32 of the adding machine assembly 30 to differential positions in the manner described. One code plate 38 is provided for each of the actuator racks 32. As shown in FIG. 6, the control unit 34 has one extra code plate 38 which is not used in this instance. However, the extra code plate is used in the same manner as the other code plates when the control unit 34 is combined with an adding machine assembly which makes provision for registering an additional numerical order on the keyboard 12.

The code plates 38 are slidably supported on edge in a tilted frame 36 for translation independently of each other rearwardly from starting positions in the medial portion of the frame.

Figures 3, 4, 5, 7, 9:
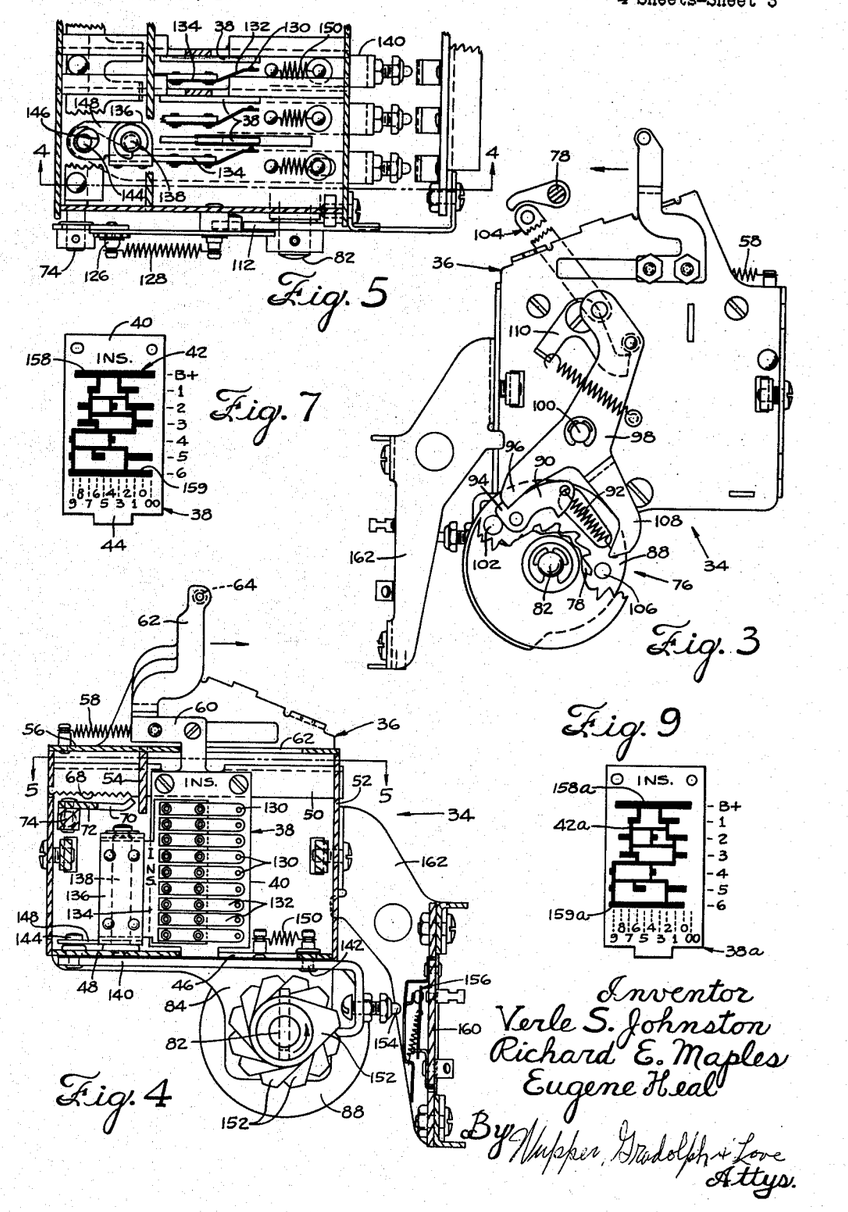
FIG. 3 is a left side view of the control unit.
FIG. 4 is a vertical sectional view of the right hand side of the recorder control unit taken with reference to the line 4—4 of FIG. 5.
FIG. 5 is a fragmentary horizontal sectional view of the recorder control unit taken along the line 5—5 of FIG. 4.
FIG. 7 is a side view of an exemplary code plate used in the recorder control unit.
FIG. 9 is a side view of one variant of the code plates which can be used to modify the operation of the control unit.

As shown in FIG. 7, each code plate 38 comprises a rectangular plate or board 40 of insulating material. One side of each code plate board 40 supports a flat conductor 42 laid out in a predetermined pattern so that it will coact with a line of coacting contacts to be described, to provide differently coded circuit connections for each of a plurality of differential positions of the code plate corresponding to the different numerical positions of a coacting actuator rack 32 of the adding machine assembly 30.

The lower end of each code plate 38 is guided for translation in the control unit frame 36 by a downwardly projecting tang 44 on the lower end of the code plate board 40, which projects into a rearwardly extending slot 46, FIG. 4, in a bottom panel 48 of the frame. The upper end of each code plate 38 is secured to the medial portion of a slide bar 50 which extends from the front to the rear of the frame 36. As shown in FIGS. 4 and 6, each slide bar 50 is slidably supported in the rear panel 52 of the frame 36 and in a medial transverse member 54 depending from the top panel 56 of the frame 36.

Each code plate supporting bar 50 is individually urged toward the front of the control unit 34 by a spring 58 anchored to the control unit frame 36 and connecting with a bracket 60 fixed to the medial portion of the bar and projecting up through a slot 62 in the top panel 56 of the frame, FIG. 4. In this manner, each code plate 38 is urged forwardly to a normal starting position in the central portion of the frame 36.

From its normal starting position, each code plate 38 is displaced rearwardly by rearward movement of a corresponding actuator rack 32 incident to an operating cycle of the adding machine assembly 30. For this purpose, a plurality of actuator arms 62 are connected to the respective code plate brackets 60, FIGS. 4 and 6, to support actuator abutments 64 in immediate opposing relation to the rear edges of tangs 66 projecting downwardly from the respective actuator racks 32. As shown in FIG. 6, the individual actuator arms 62 are laterally offset, as necessary, to effect a lateral alignment of the arm abutments 64 with the actuator rack tangs 66, which are spaced farther apart than the code plates 38.

Hence, rearward movement of an individual actuator rack 32 to any one of its ten numerical positions effects a similar displacement of the corresponding code plate 38 rearwardly to any one of ten differential positions. Since the rearwardly displaced actuator racks 32 start immediately to return to their initial forward positions, rectifying means is provided to temporarily latch the rearwardly displaced code plates 38 in their positions of maximum displacement until they have been sensed or "read" by coacting contact and circuit structure which will be presently described.

The lower edge of the forward end of each slide bar 50 is formed into a rack having a series of notches 68, FIG. 4, corresponding to the ten numerical positions of displacement for the coacting code plate 38. When the actuator racks 32, and hence the code plate 38, have reached their positions of maximum rearward displacement, the notched end portions of the slide bars 50 are individually engaged by teeth or detents 70, FIG. 4, on a cantilevering detent comb or rectifier 72 fixed to a rock shaft 74 transversely mounted in the forward portion of the frame 36.

The rectifier teeth 70 are engaged with the notched slide bars 50 by a counterclockwise rotation, FIG. 4, or rocking of the shaft 74 in timed relation to the completion of rearward movement of the actuator racks 32. This action is initiated by engagement of a single revolution clutch 76 on the control unit 34, FIG. 3, as an incident to completion of the first phase of rotary movement of a rock shaft 78 forming a standard component of the adding machine assembly 30, FIG. 2. The rock shaft 78 itself is operated in a well-known, conventional manner in which it rotates first in one direction through a predetermined angle, and then in the opposite direction back to its initial position.

The single revolution clutch 76 itself is of a conventional design. As shown in FIGS. 3 and 6, the clutch 76 comprises a ratchet wheel 78 formed on a sleeve 80 journaled on a projecting end of a cam shaft 82. The cam shaft 82 is journaled in brackets 84, FIGS. 4 and 6, projecting down from the rear portion of the control frame 36. The sleeve 80 and ratchet 78 are rotated by a pulley 86 on the sleeve which is belt driven from the electric driving motor 198 (illustrated diagrammatically in FIG. 8) of the adding machine assembly 30.

A disc 88, fixed to the cam shaft 82 in adjacent relation to the ratchet wheel 78, carries a pivoted pawl 90, FIG. 3, which is biased toward engagement with the ratchet wheel by a spring 92. Normally the pawl 90 is thrown out of engagement with the ratchet wheel 78 by an abutment lug 94 on the pawl which is engaged by one leg 96 of a bifurcated control lever 98. The lever 98 is centrally pivoted on a stub shaft 100 projecting from the control unit frame 36. While engaged by the control lever leg 96, the pawl lug 94 is swung into engagement with an abutment stud 102 on the disc 88, thus positively holding the disc 88 and shaft 82 against rotation.

As the operating shaft 78 of the adding machine assembly 30, FIGS. 2 and 3, completes the first phase of its movement, a connecting linkage 104 between the shaft 78 and the clutch lever 98 swings the latter above pivot 100 to disengage the lever from the pawl 90, allowing the latter to drive the disc 88 and the shaft 82 from the rotating ratchet wheel 78. As the disc 88 approaches the completion of a single revolution, a second stud 106 on the disc 88 engages a second leg 108 of the lever 98 to swing the latter in the opposite direction about the pivot 100 to again engage the lever leg 96 with the pawl 90 as previously described. The result is to disengage the pawl 90 and terminate rotation of the shaft 82 after a single revolution. A spring-biased detent 110 coacts with the lever 98 to yieldably hold the latter in either of its two positions.

Initial rotation of the cam shaft 82 operates a circular cam 112, fixed to the right end of the cam shaft, FIG. 2, to effect the previously mentioned movement of the rock shaft 74, FIG. 4, which holds the code plates 38 in their respective displaced positions. When the cam 112 is in its starting position shown in FIG. 2, a single depression 114 in the otherwise circular periphery of the cam receives a rotary cam follower 116 on a slide lever 118. As shown, the lever 118 is slidably mounted on a support stud 120 and connected at its opposite end to a lever 122 projecting radially from the rock shaft 74. An eccentric connection 126 between the rock shaft lever 122 and the sliding lever 118 provides a convenient adjustment of the rotary position of the rock shaft 74. A spring 128 biases the cam follower lever 118 against the cam 112.

Hence, upon rotation of the cam 112, the follower 116 is displaced from the notch 114 to rotate the rock shaft 74 and hold the detent fingers 70 in ratchet engagement with the code plate slide bars 50 until the cam 112 has turned through a complete revolution, whereupon the spring 128 disengages the detent fingers 70 from the slide bar notches 68. Only then are the code plates 38 released for return movement to their starting positions by the springs 58.

Each code plate slide bar 50 and its coacting actuator rack 32, together with the abutment structure which carries the slide bar rearwardly with the actuator rack, constitute a "split rack," the adding machine assembly portion 32 of which is free to return to its forward position while the slide portion 50 is temporarily retained in a rearwardly displaced position in the manner described.

While the code plates 38 are temporarily restrained in their rearwardly displaced positions, the differential positions of the respective plates are "read" or sensed electrically in turn by highly versatile means that can be readily adapted to sense the positions of the plates in any desired order. The sequential reading or electrical sensing of the positions of the respective code plates 38 in the desired order is effected by a single revolution of the cam shaft 82.

The differential position of each code plate 38 is electrically sensed in code by a series of spaced electrical contacts or feelers 130 located on the conductor side of the code plate and arranged in a straight line, FIGS. 4 and 5, perpendicular to the direction of displacement of the code plate. In the illustrated construction a total of nine contacts 130 are provided. As will presently appear, one of the contacts 130 is used to energize the conductor pattern 42 on the coacting code plate 44. Thus the eight remaining contacts 130 make available a total of eight code channels or circuit paths in which code signals can be transmitted. If desired, each code plate 38 can be lengthened and additional contacts 130 provided to make available any number of code channels. However, in the present instance, only a five-channel code is used. Of the three remaining contacts 130, one is used to control an indexing clutch in the recorder 14 in a manner to be described later. Two of the contacts 130 are not used.

As shown in FIGS. 4 and 5, the contacts 130, coacting with each code plate 38, are fixed to the projecting ends of resilient conductors 132 cantilevering from a terminal panel 134 formed of a suitable insulating material. One terminal panel 134 is provided for each code plate 38. Disposed in generally parallel, spaced relation to the coacting code plate 38, each terminal panel 134 is pivotally supported by a bracket 136 on a support stud 138 projecting upwardly from the lower panel 48 of the control unit frame 36.

After each code plate 38 has been shifted to and locked in its displaced position as previously described, it is engaged by its coacting contacts 130, which are moved toward the code plate by swinging of the associated terminal panel 134 about the coacting stud 138. This action is produced by a cam follower 140 formed by a slide bar (also denoted by the numeral 140) disposed along the underside of the control unit frame 36. Extending generally from the front to the rear of the lower frame panel 48, each slide bar 140 is supported by suitable guides 142 for translation toward and away from the front of the frame 36.

A pin 144 in the forward end of each slide bar 140 fits into an oblique slot 146, FIG. 5, in a radial actuator 148 on a coacting contact support bracket 136. Hence, rearward movement of the slide bar 140 operates to effect the pivotal movement of the coacting bracket 136 required to engage the associated contacts 130 with the adjacent code plate 38 in the manner described.

Each slide bar 140 is biased forwardly to a starting position by a coacting spring 150, FIGS. 4 and 5.

The cam follower slides 140 are individually displaced rearwardly by a series of single lobe cams 152 mounted on the shaft 82 in alignment along a shaft with the respective cam followers. As shown in FIG. 4, the rear end of each cam follower slide 140 is turned downwardly and forwardly to an extreme end which opposes its coacting cam 152.

The successive cams 152 along the shaft 82 are displaced around the shaft relative to each other so that, upon rotation of the shaft through its single revolution, the successive cam lobes along the shaft effect a sequential rearward displacement of the respective followers 140. As will presently appear, this action is used in achieving the desired sequential reading of the code plates 38.

The respective cams 152 are structurally independent of each other except for their attachment to the common shaft 82. Hence, the cams 152 can have any desired angular disposition with respect to each other around the shaft 82. It follows that the slide bars 140 can be operated and the code plates 38 read in any desired order.

As each cam follower 140 approaches its extreme rearmost position, an adjustable switch actuator 154 projecting rearwardly from the follower, as is shown in FIG. 4, closes a coacting switch 156 mounted on a switch board 160 supported by brackets 162 on the rear of the control unit frame 38.

As will presently appear, each switch 156 is electrically connected to energize the conductor pattern 42 on a code plate 38 which is fully engaged by its coacting contacts 130 before the switch is closed. One switch 156 is provided for each code plate. The connection from the closed switch 156 to its code plate conductor pattern 42 is made through one of the contacts 130 which engages a bus bar segment or portion 158 of the code plate pattern.

Referring to the exemplary code plate illustrated in FIG. 7, it will be observed that the conductor 42 is laid out in a coded pattern with reference to the vertical positions of the seven previously mentioned contacts 130 which coact with the code plate, and also with reference to the eleven different horizontal positions which the code plate may occupy relative to the line of the coacting contacts. These eleven last-mentioned relative positions of the code plate 38 correspond to the normal or starting position of the code plate and the ten differentially spaced positions to which the code plate may be displaced rearwardly of its starting position. In FIG. 7, these eleven positions are designated by the horizontal rows of numerals in which the starting position is designated by a double zero, and the other ten numerical positions are designated by the corresponding numbers.

It will be observed that the previously mentioned bus section 158 of the conductor 42 lies in a straight line at the level of the uppermost of the seven active contacts. This bus portion is dimensioned for engagement by the coacting contact in all eleven positions of the circuit plate. Since the contact 130, which coacts with this bus section 158, provides a supply of B+ current, as will be described presently, the level of the bus section is designated in FIG. 7 by the symbol "B+." At the next five successively lower levels designated by the vertical row of numerals 1 to 5, the layout of the conductor 142 at each level is differentiated relative to that at the other levels and with respect to the successive relative positions of the line of coacting contacts 130 to provide the desired code for each numerical position of the code plate 38.

At the lowest level, designated in FIG. 7 by the number "6" in the vertical row, the conductor 42 forms an indexing clutch energizing bar 159 extending through all ten of the numerical positions or stations of the code plate 38 in relation to its coacting contacts 130. The lowest active contact 130 coacts with the bar 159 to energize a recorder indexing clutch in a manner to be described later.

On the specific code plate 38 shown in FIG. 7, the indexing clutch energizing bar 159 extends into the starting or "00" position of the code plate. Moreover, the conductor pattern at the five intermediate or coding levels is the same for the "00" position as for the "0" position of the code plate. As will presently appear, the purpose of this is to cause the connected recorder 14 to record a "0" for each numerical order within the capacity of the input unit 10 when no other significant figure is entered in that numerical order. This is essential to proper operation of some recording systems that can be used with the input unit 10.

Figure 8:
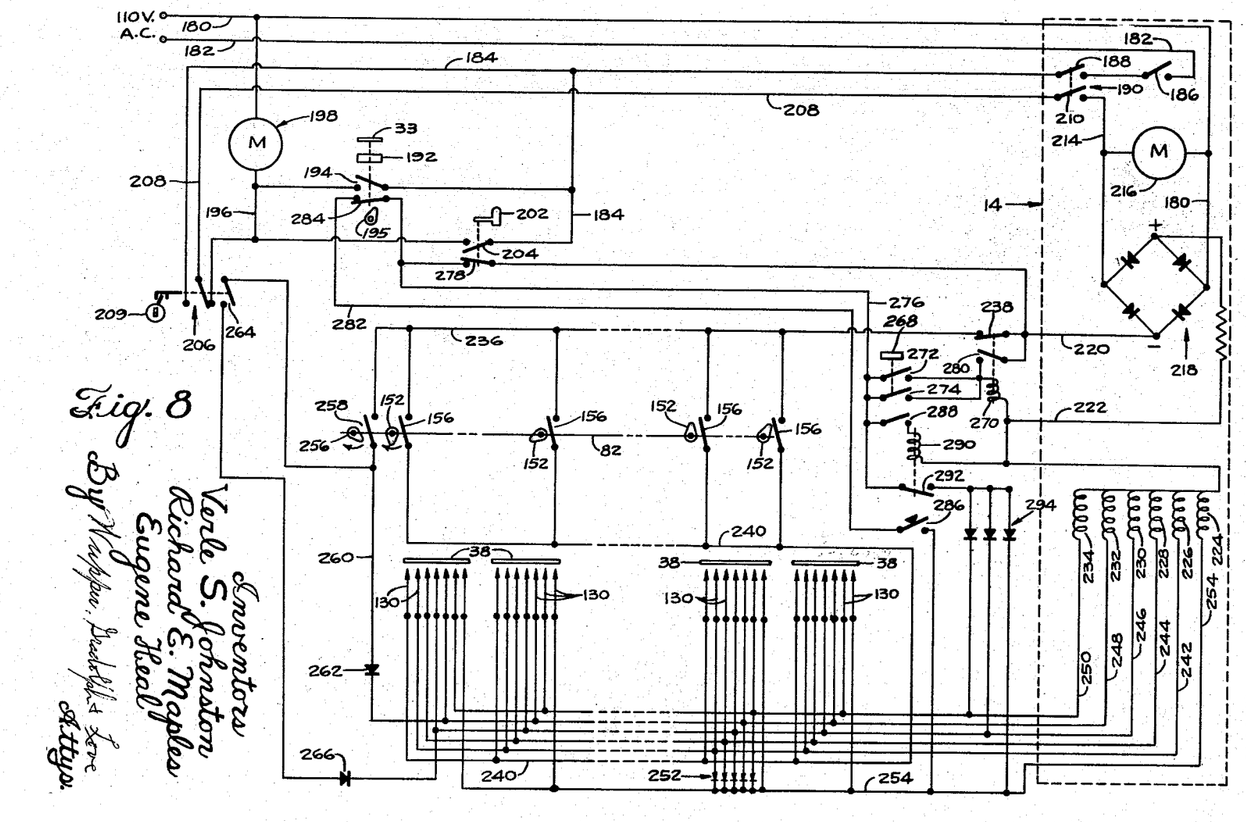
FIG. 8 is a diagrammatic illustration of the electrical circuitry used in recording in code selected operations of the adding machine assembly.

The integrated circuitry used in recording selected operations of the adding machine assembly 30 along with collateral data is illustrated diagrammatically in FIG. 8. That portion of the circuitry which forms a part of the recorder unit 14 is blocked out in FIG. 8 by the rectangular block indicated in phantom lines and designated by the numeral 14.

The recorder 14 used in the present instance is a commercially available tape punching unit having a construction well known in the tape punching recorder art and requiring no detailed description here. One commercial supplier of tape punching recorder suitable for this purpose is the Commercial Controls Corporation, One Leighton Avenue, Rochester 2, New York.

Electric power for operating the tape recorder 14 and the input unit 10, FIG. 1, which includes the integrated adding machine assembly 30 and the recorder control unit 34, is supplied through two power leads 180, 182, FIG. 8, which together form a standard source of A.C. power at approximately 110 volts. The power lead 182 extends into the tape recorder 14 where it is connected to an output power lead 184 through a tape controlled switch 186 and one pole 188 of a double pole, single throw master control switch 190. The tape switch 186 is a part of a standard protective feature on the tape recorder 14 which is designed to open the switch 186 and deenergize the recorder when the recording tape is so tight it will not feed when the supply of tape in the recorder 14 is exhausted. As will presently appear, opening the tape switch 186 also serves to deenergize the adding machine assembly 30, thus precluding operation of the adding machine assembly until the recorder 14 has been serviced to provide an adequate supply of recording tape which will feed through the recorder.

Closing of the master switch 190 supplies power to the conductor 184 for energizing the adding machine assembly 30. Depression of the motor bar 33 on the keyboard 12 closes a switch 194 to connect the energized conductor 184 with a conductor 196 leading to one side of the conventional driving motor 198 incorporated into the adding machine assembly 30. The opposite side of the motor 198 is connected to the other power lead 180 so that the motor is started upon depression of the motor bar 33.

A suitable latch 192, FIG. 8, holds the switch 194 closed until it is opened at the end of the operating cycle of the adding machine assembly by an element 195 moved by mechanisms in the adding machine assembly.

After the adding machine assembly 30 has completed its operating cycle, energization of the motor 198 is continued through a holding switch 204 until the control unit 34 has completed its cycle. Connected electrically between the conductors 184 and 196, FIG. 8, the holding switch 204 is mounted on the right hand side of the control unit frame 36 to be closed by an arm 202 on the cam follower slide 118, when this slide is displaced from its normal position by the cam 112.

Normally, the tape recorder 14 is energized through the conductor 196 used in energizing the adding machine assembly motor 198. For this purpose the conductor 196 is connected to one input terminal of a single pole, double throw switch 206. A second input terminal of the switch 206 is connected directly to the conductor 184, which is energized upon closing of the master switch 190. The output terminal of the switch 206 connects with a conductor 208 leading back to a second pole 210 of the double pole, single throw master switch 190.

It is noteworthy that the switch 206 is controlled by a cylinder lock 209 on the keyboard 12, FIGS. 1 and 8, which must be operated by a key to shift the switch 206 to connect the conductor 184 directly to the conductor 208, thus energizing the recorder 14 independently of the adding machine assembly 30.

When the master switch 190 is closed, the conductor 208 is connected to a recorder power supply conductor 214 to energize the recorder driving motor 216 connected between the conductor 214 and the main power supply conductor 180. A full wave rectifier 218 connected between the conductors 214 and 180 supplies direct current power through two conductors 220, 222. As shown, the conductor 220 is charged positively.

The conductor 222 is connected to one side of each of six electrical windings 224, 226, 228, 230, 232 and 234. These windings form a part of the standard construction of the recorder 14. The winding 224 is used to control a tape advancing clutch to advance the recording tape one step upon energization of the winding. The five remaining windings 226 to 234 are used respectively to control five tape punching elements which are used in any combination to punch coded data into the tape (not shown).

These punch control windings 226 to 234 are controlled by coded electrical signals produced by the respective code plates 38 operating in conjunction with the opposed sets or groups of contacts 130.

As previously mentioned, energy for producing these coded control signals is supplied through the series of switches 156, FIG. 4, which are closed in succession in the manner described.

As indicated diagrammatically in FIG. 8, one side of each of the switches 156 is connected to a common conductor 236, which is energized through a normally closed relay switch 238 from the direct current power supply line 220. In view of the duplication of switches 156, code plates 38, and associated groups of contacts 130, only four examples of each are shown in FIG. 8.

The side of each switch 156 opposite from the energizing conductor 236 is connected to an output conductor 240, which is connected to a contact 130 associated with each code plate 38 and serving as a power supply for directly energizing the bus bar portion 158, FIG. 7, of the conductor 42 on the code plate.

Hence, upon engagement of one of the code plates 38 with its associated line of contacts 130 and closing of a switch 156 by the continued action of the cam 152, FIG. 4, which effected the engagement of the code plate with its contacts, current is supplied from the conductor 236 through the closed switch 156 and through the conductor 240 to the contact which engages the energizing bar portion 158 of the code plate.

In this connection it will be remembered that the switch 156 associated with each code plate 38 is not closed until the code plate has been fully engaged by its coacting contacts 130. This completely eliminates arcing or sparking between the code plate conductor pattern 42 and the associated contacts 130 which could otherwise erode away and shorten the service life of the structure.

Of the seven contacts 130 coacting with each code plate 38, the six contacts not connected with the power supply conductor 240 are connected respectively to the clutch winding 224 and the respective punch control windings 226 to 234. As indicated in FIG. 8, a conductor 254 connects the clutch winding 224 with the lowermost active contact 130, coacting with each code plate 38 and opposing the clutch energizing bar 159 on the plate, FIG. 7. Five conductors 242, 244, 246, 248, and 250 connect the five punch control windings 226, 228, 230, 232, and 234 respectively with the five intermediate and active contacts 130 associated with each code plate 38.

The five conductors 242 to 250 leading to the respective punch control windings 226 to 234 are individually connected through five diode rectifiers 252 to the conductor 254 leading to the clutch control winding 224. The rectifiers 252 prevent current from feeding back from the clutch operating conductor 254 to any one of the punch winding conductors 242 to 250. However, energization of any one of the five punch windings 242 to 250 also energizes the clutch winding 224 to advance the tape one step.

It is noteworthy that the last code plate 38 is read and its energizing switch 156 opened an appreciable time before the single revolution of the control unit cam shaft 82 is completed. As the cam shaft 82 continues to complete its single revolution, an auxiliary cam 256, FIG. 8, on the cam shaft 82 operates to close a switch 258 which controls the recorder 14 to punch into the tape a code indicating that the sequential reading of all the code plates 38 has been completed, and indicating the character of the operation of the adding machine assembly 30 that moved the code plates into their differential positions.

As shown, the switch 258 connects the energized conductor 236 with a conductor 260, FIG. 8, which is connected through a diode rectifier 262 with the conductor 248 leading to the punch winding 232. Energization of the punch winding 232, and hence the clutch winding 224, effects the punching in the tape of a code. In this instance the code punched in this manner indicates that all the code plates 38 have been read and that the previously punched data obtained from the series of code plates should be added, or, more specifically, that the adding machine assembly 30 has gone through an operating cycle that registered an "add" item.

In the event the sales item entered on the keyboard 12, FIG. 1, is a "non-add" item, the adding machine assembly 30 is preconditioned to go through a "non-add" cycle upon depression of the motorbar 33. The conventional mechanisms in the adding machine assembly 30 which are used in carrying out a "non-add" cycle are activated in this instance by the previously mentioned cylinder lock 209. The key to this lock cam can be retained by a supervisor who is thereby assured that the machine will not be run through a "non-add" cycle without his knowledge. Operation of the cylinder lock 209 to condition the adding machine assembly 30 to go through a "non-add" cycle also shifts the previously mentioned switch 206 to energize the recorder 14 directly from the conductor. At the same time a switch 264, ganged with the switch 206, is closed. Closed switch 264 connects the conductor 260 through a diode rectifier 266 with the conductor 246 leading to the punch winding 230.

When the cylinder lock 209 has been operated to condition the machine for a "non-add" cycle and the motor-bar 33 is depressed to start the cycle, it follows that closure of the switch 258 near the end of the rotary cycle of the cam shaft 82 energizes both of the punch windings 230 and 232 and also the clutch winding 224. This punches in the tape a code indicating that all of the code plates 38 have been read and that the adding machine assembly 30 has gone through a "non-add" cycle.

The provision for punching of the "add" and "non-add" codes is illustrative of the manner in which the control unit 34 can be coordinated with the adding machine assembly 30 to identify in code on the recording tape the character of the recorded operations of the adding machine assembly. Thus it will be appreciated that any desired arrangement of switches can be connected between the conductor 260 and the various tape recorder windings 224 to 234 and coordinated with other controls on the keyboard 12, such, for example, as the total and subtotal key 268, FIG. 1, so that closure of the switch 258 effects a coded identification of other recorded operations of adding machine assembly in which the racks 32 are displaced differentially.

If it should be desirable to record a coded identification of the character of an operating cycle of the adding machine assembly 30 before the operating cycle itself is recorded, this can be done simply by advancing the cam 256 on the shaft 82 so that it closes the switch 258 before the switches 156 are closed in succession.

Moreover, the control unit 34 can be readily adapted to record only those operations of the adding machine assembly 30 which are of a predetermined character and block the recording of operating cycles of a different character. In the present instance, it is desirable to record on tape only the individual items entered on the keyboard 12 without recording the total and subtotals taken by the adding machine assembly 30. Hence, means are provided for blocking out the recording of movements of the actuator racks 32 incident to totaling and subtotaling operations.

Thus, when the adding machine assembly 30 is operated by the key 268 to provide either a subtotal or a total, the switch 238 which supplies power for reading the code plates 38 is opened by energization of a switch solenoid 270, FIG. 8. One side of the solenoid 270 is connected to the direct current power conductor 222. The other side of the solenoid 270 is connected to the output terminals of two switches 272, 274 which are closed respectively upon movement of the key 268 to either its total or subtotal position.

Closure of either of the switches 272, 274 connects the solenoid 270 with a conductor 276 which is connected to the direct current power supply conductor 220 through a normally closed switch 278 ganged with the previously mentioned switch 204 operated by the control unit 34, FIG. 2. The switch 278 is opened simultaneously with the closing of the switch 204 and kept open until the rotary cycle of the cam shaft 82 is completed.

Since the switching arrangement which operates to prevent recording of a subtotaling or totaling cycle of the adding machine assembly 30 is deenergized at the beginning of rotation of the cam shaft 82, it cannot be used to prevent the normal recording of an operating cycle of the adding machine assembly which registers an item entered on the keyboard 12. After a sales item has been entered on the keyboard 12 by depression of one or more of the keys 20, conventional interlocks on the adding machine assembly 30 prevent operation of the total and subtotal key 268 and thereby prevent closure of either of the switches 272, 274 until the adding machine assembly has been started in an operating cycle which registers the item entered on the keyboard. By the time the key 268 is released for movement to a totaling or subtotaling position, the rotating shaft 82 keeps the switch 278 open to prevent energization of the solenoid 270 through either of the switches 272, 274. In this manner, the operator is prevented from interfering with the automatic recording on the punch tape of any item registered in the adding machine assembly 30.

Thus the solenoid 270, which opens the recording switch 238, can be energized only when one of the switches 272, 274 is closed in preparation for a subtotaling or totaling cycle. Energization of the solenoid 270 in this manner closes a switch 280 ganged with the switch 238. The closed switch 280 connects the solenoid 270 directly to the current power conductor 222 to maintain energization of the solenoid after the switch 278 has been opened by rotation of the cam shaft 82.

Provision is made for effecting a step-by-step advancement of the recording tape without punching a coded record into the tape, but only when the motor 198 for the adding machine assembly 30 is deenergized. For this purpose the conductor 276, energized through the normally closed switch 278, is connected to a tape advancing conductor 282 through a normally closed switch 284 ganged with the switch 194 to be opened by depression of the motor bar 192. Thus it will appear that the conductor 282 can be energized only when the circuit through the motor 198 is open.

To provide power in the conductor 282 while the motor 198 is deenergized, the switch 206 is operated by the cylinder lock 209 to energize the recorder 14 independently of the motorbar 33. The conductor 282 is connected through a normally open tape advancing switch 286 with the conductor 254 leading to the tape advancing clutch winding 224. Closure of the switch 286 with the conductor 282, energized as described, effects the desired stepping of the tape. Thus closing of the switch 286 will effect a stepping of the recording tape, but only under conditions which will not interfere with normal operation of the apparatus. Moreover, it cannot be done without first obtaining the key for operating the cylinder lock 209.

Subsequent auditing and tabulating of the data recorded on the punched tape can, in some instances, be facilitated by recording collateral data in code on the recording tape. One example of this is the recording of the close of significant business periods, such as the end of a sales day or the like. Provision is made for recording such data by means which cannot be used to falsify the normal recording of an operating cycle of the adding machine assembly 30.

To provide this protection against falsification, the circuitry provided for recording the collateral data is energized from the conductor 276, which is supplied with power only when the cam shaft 82 is in its starting position and the switch 206 has been shifted by the cylinder lock 209 to energize the conductor 208 directly from the conductor 184.

When the conductor 276 is energized under these conditions, an "end-of-period" switch 288 is closed to connect a solenoid 290 between the energized conductor 276 and the direct current power supply conductor 222. Energization of the solenoid 290 closes a switch 292 to connect the conductor 276 through three diode rectifiers 294 to the conductors 254, 246 and 250 which respectively energize the clutch winding 224 and the tape punching windings 230 and 234. Energization of these windings punches into the tape a code representing the desired collateral information; in this instance, the end of a business period.

The sales registering and recording means thus provided operates to assure a correct recording on the punched tape of each sales item registered in the input unit 10, FIG. 1, together with such additional data that is required for efficient reading of the tape in the tape reader 16.

It is particularly noteworthy that added assurance against any attempt to tamper with normal operation of the recording apparatus is provided by the necessity to obtain the key to operate the cylinder lock 209 before the input unit 10 can be run through any one of the special operations of going through a non-add cycle, advancing the tape without making a code recording, or recording an "end-of-period" code.

The recorded tape is placed in a tape reader and decoder 16, FIG. 1, which identifies each sales item according to the characterization and identification of the item at the time it was entered on the keyboard 12 in the manner described. The reader 16 directs the amount values of each sales item into one or more of several totalizers 18 corresponding to the identification or classification of the sales item.

Supplied by the reader and decoder 16 with the amount values of classified sales items, each totalizer 18 operates to tabulate and totalize the sales in one particular category or class.

Since tape readers and decoders and totalizers capable of reading and decoding the recorder tape and making the desired tabulations from the tape are well known in the tape reading art, these structural assemblies of the system need not be further described.

It should be pointed out that in those instances in which the operating characteristics of the reader and decoder 16 do not require that a zero be recorded in every denominational order to the left of a significant figure in a recorded numerical value, the recording unit 34 can be readily modified to make a recording in only those numerical orders in which a significant figure or value appears in the recorded operating cycle of the adding machine assembly 30. This is accomplished by a slight modification of the code plates 38. As shown in FIG. 9, which illustrates a code plate 38a modified for this purpose, the pattern of the conductor 42a in each of the six levels below the B+ bus section 158a is terminated short of the starting or "00" position of the code plate relative to its line of coacting contacts. As previously explained, each code plate corresponding to a numerical order to the left of a significant figure in an operating cycle of the adding machine assembly 30 remains in its starting position during the recording of an operating cycle. Hence, when the modified code plate 38a is used, none of its six coacting contacts 130 connected respectively to the clutch winding 224 and the punch windings 226 to 234 is energized when the code plate is read or sensed in its starting position. Consequently, none of the recorder windings 224 to 234 is energized, with the result that the recording tape is not advanced and is not punched.

This is of considerable advantage in conserving tape and speeding up the subsequent reading and decoding process when the making of a recording in each denominational order is not essential to proper operation of reading and decoding apparatus.

While we have shown preferred embodiments of our invention, it will be apparent that variations and modifications thereof may be made without departing from the underlying principles and scope of the invention. We therefore desire, by the following claims, to include all such variations and modifications by which substantially the results of our invention may be obtained through the use of substantially the same or equivalent means.

We claim:

1. A self-recording business machine comprising, in combination, a keyboard including a plurality of keys having different assigned values, a plurality of actuator racks movable simultaneously into differential positions controlled by said keys, a plurality of code members corresponding to said respective actuator racks, each of said code members having a pattern of conductors thereon conforming to a predetermined multiple place binary code, each of said code members having a positioning element connected thereto and extending into a position for engagement by a corresponding one of said actuator racks to effect a differential positioning of the code member as an incident to movement of the actuator rack to a differential position, a set of code contacts coacting with each of said code members in opposing relation to said conductors thereon, each of said contact sets having a number of contacts at least equivalent to the number of places in said multiple place binary code plus an energizing contact, means for mutually engaging each code member and its coacting set of contacts upon displacement of the code member to a differential position, means for energizing said conductors on said respective code members through said energizing contacts, code recorder means, and recorder control means connecting said recorder means electrically to said sets of contacts for said respective code members and including switching means for completing control circuits to said recorder means through said sets of contacts and said conductors on said respective code members in succession.

2. In a business machine adapted to telemeter its own operations automatically, the combination of a plurality of actuators movable at once into differential positions, a plurality of code plates corresponding to said respective actuators, each of said code plates having a pattern of interconnected conductors thereon conforming to a predetermined code, a set of contacts coacting with each of said code plates, means for effecting a differential relative displacement between each of said code plates and its coacting set of contacts as an incident to movement of the actuator corresponding to the code plate into a differential position, aligning means operable as an incident to movement of said actuators into differential positions to temporarily maintain the displacement of said code plates and said coacting sets of contacts relative to each other, a plurality of engaging mechanisms corresponding to said respective code plates and connected to effect a mutual engagement of said respective code plates and said coacting sets of contacts, a cam shaft, a plurality of cams on said cam shaft coacting with said respective engaging mechanisms to actuate the latter in sequence upon rotation of said cam shaft, cycling means connected to rotate said cam shaft, an electric power conductor and a plurality of output conductors, and means for connecting said output conductors and said power conductor to individual contacts in said sets of contacts for energization of said output conductors from said power conductor through the contacts and code plate conductors when the contacts are in engagement with conductors on the coacting code plates.

3. In a self-recording machine, the combination of a plurality of actuators movable into differential positions, a plurality of code members corresponding to said respective actuators, displacing means coacting with each of said actuators and the corresponding code member to displace the latter to a differential position as an incident to movement of the actuator to a differential displaced position, each of said code members including a conductor thereon shaped into a pattern conforming to a predetermined code, a set of multiple contacts opposing said conductor on each code member, a plurality of output conductors connected to the corresponding ones of said contacts in each of said sets, individual code marking means connected to be actuated directly by energization of respective ones of said output conductors, electrical energizing means connected to establish electrical energizing circuits in succession to each code member conductor so as to energize any of said code marking means which are connected to contacts engaged by each code member conductor in succession, whereby said individual code marking means are actuated in successive simultaneous patterns representative of the positions of said successive code members relative to their respective multiple contact sets.

4. For use with a business machine having a plurality of actuators movable at once into differentially displaced positions, a single unit control device adapted for operation automatically as an incident to movement of the business machine actuators into differentially displaced positions to electrically transmit the operations of the business machine in electrical code, said control unit comprising, in combination, a battery of parallel code plates, each of said code plates including conductors thereon shaped to form a pattern conforming to a predetermined code, a plurality of split actuator elements connected with said respective code plates to displace the latter to differential positions, aligning means coacting with said code plates to retain the latter in differential positions of displacement upon activation of the aligning means, a plurality of movable supports corresponding to said respective code plates, a set of contacts mounted on each movable support in opposing relation to the pattern of conductors on the corresponding code plate, a cam shaft, transmission means connected to drive said cam shaft through an operating cycle, means connecting said cam shaft to said aligning means to activate the latter upon movement of the cam shaft, a plurality of cams on said cam shaft corresponding to said respective movable supports, cam follower means extending between said respective cams and said respective movable supports to move said sets of contacts into engagement with the conductors on said respective code plates in sequence upon movement of the cam shaft through an operating cycle, electrical energizing means including a plurality of power supply switches, means for connecting said power supply switches to said conductors on said respective code plates to energize all of said code plate conductors at substantially the same potential, cam follower means associated with said respective cams and coacting operatively with said respective switches to close the latter in delayed synchronism to engagement of the corresponding code plates by said sets of contacts, a plurality of output conductors, and means for connecting said output conductors individually with corresponding ones of said contacts in each of said sets so that all of said output conductors which are connected to contacts engaging respective code plate conductors are energized at the said potential when the respective switches are closed.

5. For use with a business machine having a plurality of actuators movable at once into differentially displaced positions, a single unit control device adapted for operation automatically as an incident to movements of the business machine actuators into differentially displaced positions to electrically transmit operations of the business machine in code, said control unit comprising, in combination, a battery of parallel code plates, each of said code plates including a conductor thereon shaped to form a pattern conforming to a predetermined code, a plurality of actuating elements adapted for movement by business machine actuators and connected with said respective code plates to displace the latter to differential positions, means for retaining said code plates in differential positions, a plurality of movable supports corresponding to said respective code plates, a set of multiple contacts mounted on each movable support in opposing relation to the conductor on the corresponding code plate, a cam shaft, transmission means connected to drive said cam shaft through an operating cycle, a plurality of cams on said cam shaft corresponding to said respective movable supports, cam follower means extending between said respective cams and said respective movable supports to move said sets of multiple contacts in sequence into engagement with the conductor on said respective code plates where said conductor opposes said contacts upon movement of the cam shaft through an operating cycle, a plurality of output conductors, means for connecting said output conductors individually with corresponding ones of said contacts in each of said multiple contact sets, and means for electrically energizing said conductors on said respective code plates so as to energize each of the output conductors connected to a contact opposed to a respective code plate conductor.

6. For use in telemetering the operations of a machine including a plurality of actuators movable at once into differentiated positions, an integrated control unit comprising, in combination, a battery of parallel code plates, a set of multiple contacts mounted alongside each code plate and spaced from each other across the path of displacement of the adjacent code plate, an operating element on each of said code plates adapted for engagement by a machine actuator to displace the code plate to any one of a plurality of differential positions relative to the set of contacts, each of said code plates including thereon a conductor facing the opposing set of contacts, the portions of each code plate conductor opposing each of the coacting multiple contacts having an effective location in the direction of relative movement between the code plate and its coacting contacts which is so related to the effective location in the same direction of relative movement of the portions of the same conductor facing the other contacts of the same set that the number and identity of contacts of the multiple set directly opposing each portion of the code plate conductor in the respective differential positions of the code plates identifies each differential code plate position in code, a plurality of output conductors connected to each of said multiple contact sets, and means for energizing said output conductors of each contact set through contact engagement with the respective code plate conductor.

7. In a business machine adapted to telemeter its own operations, the combination of a registering mechanism having a keyboard control therefor comprising a plurality of keys arranged in different numerical orders, said mechanism including a plurality of actuators movable to differential positions, said actuators corresponding to said respective numerical orders of said keys, a plurality of code members corresponding to said respective actuators, each code member including multiple conductors thereon arranged in a predetermined code pattern, a set of multiple contacts coacting with each code member in opposing relation to the conductors thereon, means for producing a differential relative displacement between each code member and its coacting set of multiple contacts as an incident to movement of a corresponding one of said actuators to a differentially displaced position, and energizing means connected to energize contacts in each of the sets of multiple contacts which engage conductors on each of said code members in the displaced position of said code members relative to their contact sets.

8. In a machine adapted to telemeter its own operations in code, the combination of a plurality of code members each having a pattern of conductors thereon conforming to a predetermined code, a multiple set of electrical contacts coacting with each code member in opposing relation to said conductors thereon, a plurality of actuators movable into differential positions, each of said actuators being connected to effect a differential displacement of a corresponding code member and its coacting set of contacts relative to each other as an incident to movement of the actuator to a differential position, means for effecting a mutual engagement of each code member and its coacting multiple contact set after the two are displaced differentially in relation to each other, a plurality of output conductors and an input conductor connected to each of said contact sets, and electrical energizing means including switching means connected to energize said input conductors and hence said output conductors through said code members in succession after said code members and coacting multiple contact sets have been engaged.

9. In a business machine or the like having a source of electric potential and adapted to telemeter its own operations the combination comprising a registering mechanism having a keyboard control therefor including a plurality of keys arranged in different numerical orders and including a plurality of actuators movable to different positions under control of the keys, the actuators corresponding to the respective numerical orders of the keys, a plurality of code members corresponding to the respective actuators, each code member having an electrically connected conducting surface arranged in a predetermined code pattern, a set of code contacts and an energizing contact for each code member, the energizing contacts and the code contacts of each set being electrically connected to the corresponding contacts in the other sets, cyclically operated cam means producing a relative displacement between each code member and its cooperating contacts in a predetermined sequence after movement of the actuators to differentially displaced positions for sequential momentary engagement of each member with its contacts and connecting the energizing contacts to the source only after engagement of each member with its contacts and before its disengagement to momentarily energize certain of the code contacts in accordance with the position of their respective actuator.

References Cited in the file of this patent

UNITED STATES PATENTS

| | | |
|---|---|---|
| 1,834,561 | Watson | Dec. 1, 1931 |
| 2,207,743 | Larson et al. | July 16, 1940 |
| 2,369,430 | Brand et al. | Feb. 13, 1945 |
| 2,550,133 | Allen | Apr. 24, 1951 |
| 2,757,862 | Boyden et al. | Aug. 7, 1956 |
| 2,767,907 | Schwend | Oct. 23, 1956 |
| 2,822,130 | Nolde et al. | Feb. 4, 1958 |
| 2,927,729 | Boyden et al. | Mar. 8, 1960 |
| 2,961,155 | Olsen | Nov. 22, 1960 |

OTHER REFERENCES

Friden-Add Punch Machine-Mechanical Operation and Adjustment Manual, May 1, 1955, Friden Calculating Machine Co., San Leandro, Calif.

Taylor C. Fletcher and Norman C. Walker: "Analog Measurement and Conversion to Digits," September 1955, pages 341–45, Instrument Society of America Journal, vol. 2.